(12) United States Patent
Kang et al.

(10) Patent No.: US 6,310,924 B1
(45) Date of Patent: Oct. 30, 2001

(54) DIGITAL DEMODULATOR

(75) Inventors: Byung-Joo Kang; Kyu-Hyoun Park, both of Seoul; Kyung-Hoon Cheun, Kyungsgangbuk-do; Kwon-Hyu Choi, Jeonlamam-do, all of (KR)

(73) Assignee: Hyundai Electronics Industries Co., Ltd., Kyonggi-do (KR)

( * ) Notice: Subject to any disclaimer, the term of this patent is extended or adjusted under 35 U.S.C. 154(b) by 0 days.

(21) Appl. No.: 09/004,201

(22) Filed: Jan. 8, 1998

(30) Foreign Application Priority Data

May 6, 1997 (KR) .................................................. 97-17289

(51) Int. Cl.[7] .................................................. H04L 27/16
(52) U.S. Cl. ............................ 375/326; 375/340; 375/339
(58) Field of Search ...................................... 375/340, 346, 375/235, 283, 339, 316; 329/300, 304, 306, 307, 346; 455/183.1, 183.2, 208, 165.1, 255

(56) References Cited

U.S. PATENT DOCUMENTS

| | | | |
|---|---|---|---|
| 5,373,247 | * 12/1994 | Furukawa et al. | 329/306 |
| 5,440,268 | * 8/1995 | Taga et al. | 329/308 |
| 5,440,587 | * 8/1995 | Ishikawa | 375/332 |
| 5,487,186 | * 1/1996 | Scarpa | 455/192.2 |
| 5,621,767 | * 4/1997 | Brandt et al. | 375/344 |
| 5,666,084 | * 9/1997 | Schulz et al. | 329/307 |
| 5,673,293 | * 9/1997 | Scarpa et al. | 375/321 |
| 5,727,027 | * 3/1998 | Tsuda | 375/329 |
| 5,737,694 | * 4/1998 | McMahill et al. | 455/76 |
| 5,754,591 | * 5/1998 | Samueli et al. | 375/235 |
| 5,825,241 | * 10/1998 | Beale et al. | 329/304 |
| 5,832,043 | * 11/1998 | Eory | 375/344 |
| 5,872,815 | * 2/1999 | Strolle et al. | 375/321 |
| 5,943,363 | * 8/1999 | Hanson et al. | 375/206 |
| 5,987,069 | * 11/1999 | Furukawa et al. | 375/385 |
| 6,023,491 | * 2/2000 | Saka et al. | 375/326 |

* cited by examiner

Primary Examiner—Chi Pham
Assistant Examiner—Emmanue Bayard
(74) Attorney, Agent, or Firm—J. Harold Nissen; Lackenbach Siegel

(57) ABSTRACT

A digital demodulator which is capable of simplifying an application specific integrated circuit (ASIC) of a demodulator using a combined sampling technique. The digital demodulator includes a mixer for multiplying an IF signal from the IF output unit and a local oscillating signal from the local oscillator, a low pass filter for eliminating an image frequency component generated during an operation of the mixer, an A/D converter for converting an output signal from the low pass filter into a digital signal, a multiplier for multiplying an output data from the A/D converter and $\cos\omega t$ and $\sin\omega t$ which are combined signal values and converting into a base band width signal frequency, a demultiplexer for separating a base band width digital data into an I-signal component and Q-signal component, a frequency/phase difference detector for performing the signal processing and compensating the detected frequency and phase difference, an analog low pass filter for filtering an output signal from the frequency/phase difference detector, and a local oscillator for compensating the frequency/phase difference filtered by the analog low pass filter and providing the oscillating frequency which is synchronized with the IF signal inputted from the IF output unit to the mixer.

12 Claims, 4 Drawing Sheets $\cos\omega t + \sin\omega t: +1\ +1\ -1\ -1\ +1\ +1\ -1\ -1$

DIGITAL DEMODULATOR

BACKGROUND OF THE INVENTION

1. Field of the Invention

The present invention relates to a digital demodulator such as a grand alliance (GA) type HDTV (High Definition Television) receiving unit, and in particular, to an improved digital demodulator which is capable of simplifying an application specific integrated circuit (ASIC) of a demodulator using a combined sampling technique.

2. Description of the Conventional Art

As shown in FIG. 1, the GA type HDTV receiving unit includes an IF output unit 10 for outputting an IF (Intermediate Frequency) signal based on a signal received from an antenna 1, a carrier wave demodulator 20 for performing a carrier wave demodulation with respect to an output signal from the IF output unit, and an output unit 30 for performing a segment/field synchronization, a timing recovery, and a channel equalization with respect to an output signal from the carrier wave demodulator.

The operation of the GA type HDTV receiving unit will now be explained with reference to the accompanying drawings.

First, the signal received through the antenna 1 is converted into an IF signal by a first local oscillator 12 of a tuner 11, and a frequency drifter or variation are compensated by a second local oscillator 28 which is a voltage controlled oscillator. The second local oscillator 28 is controlled by a frequency and phase compensation loop.

In addition, the output signal from the tuner 11 passes through a SAW (Surface ascoutic wave) filter 13, thus minimizing the noise effect of a surrounding channel, and the output signal from the SAW filter 13 is amplified by a low noise intermediate frequency amplifier 14 and is inputted into mixers 21 and 22, respectively.

A mixer 21 detects an I-signal component by multiplying the output signal from the low noise intermediate frequency amplifier 14 and a cosine value of the oscillating frequency of a third local oscillator 23 of the fixed frequency, and a mixer 22 detects a Q-signal component by multiplying the output signal from the low noise intermediate frequency amplifier 14 and a sine value of the oscillating frequency of the third local oscillator 23.

Since the GA type HDTV receiving unit adapts a VSB (Vestigial Sideband) modulation method, an I-signal component is sued for processing data. However, for obtaining a frequency, the I-signal component and Q-signal component are all needed.

The AFC low pass filter 24 operates by the frequency difference between a pilot signal and the second local oscillator 28 before the synchronization of the phase is implemented like the channel of the television receiving unit is changed.

Here, the high frequency components such as a noise or an interference excluding the pilot signal are eliminated.

The pilot signal is limited by the limiter 25 having a value of ±1 and is multiplied by the Q-signal by the mixer 26. Therefore, it is possible to obtain an AFC characteristic curve having a typical S-curve.

The polarity of the S-curve error signal is determined depending whether it is higher or lower than the frequency input IF signal from the second local oscillator 28.

The signal DCed by the limiter 25 is rectified by the APC low band pass filter 27 and controls the second local oscillator 28 for reducing the frequency error.

When the frequency error becomes closer to the value of 0, the input IF signal from the carrier wave demodulator 20 and the third local oscillator 23 are phase-synchronized.

When the phases are synchronized, the pilot signal having a value of ±1 is inputted into the mixer 26.

In addition, the I-signal in which the pilot signal is detected is converted into the digital data by the A/D (Analog/digital) converter 31.

A segment synchronous detector 32 obtains a synchronous value based on the repeated segment data existing in the receiving data, and obtains a symbol clock of 10.76 MHz which is properly synchronized by the PLL 33.

An automatic gain controller 34 outputs an AGC signal which is capable of controlling the size using the low noise intermediate frequency amplifier 14 and the tuner 11 and maintains a predetermined level of the input signal.

The output data from the A/D converter 31 is outputted to the segment synchronous detector 32 and a rear portion field synchronous signal detection terminal (not shown), thus detecting the field synchronous value, and determines whether an NTSC interference eliminating filter in accordance with the level of the interference with the NTSC co-existing channel.

In addition, FIG. 2 is a block diagram illustrating an analog type circuit when converting into a base band width signal of an IF signal in the conventional art. Namely, FIG. 2 illustrates an analog type conversion circuit converting into a base band width signal with respect to the IF signal.

In order to detect the I-signal component, the IF signal inputted from the mixer 41a is multiplied by a $\cos\omega t$, and the Q-signal is multiplied by $\sin\omega t$ by the mixer 41b.

Namely, in order to obtain optimum I and Q signals, the input IF signal should be multiplied by $\cos\omega t$ and $\sin\omega t$, respectively, at a corresponding sampling time.

The output signals from the mixers 41a and 41b are converted into the digital signals by the A/D converters 43a and 43b through the low pass filters 42a and 42b and then are outputted as I- and Q-signals.

Namely, the carrier wave demodulator 20 of the GA type HDTV receiving unit performs an analog signal processing step, and the rear portion of the carrier wave demodulator 20 performs an A/D conversion step for a digital processing. Therefore, when implementing the ASIC, since the ASIC in which the digital and analog circuits are mixed is implemented, the implementation of the ASIC is difficult.

SUMMARY OF THE INVENTION

Accordingly, it is an object of the present invention to provide an improved digital demodulator which overcomes the aforementioned problems encountered in the conventional art.

It is another object of the present invention to provide an improved digital demodulator which is capable of simplifying an application specific integrated circuit (ASIC) of a demodulator using a combined sampling technique.

It is another object of the present invention to provide an improved digital demodulator which is capable of implementing an ASIC with a rear portion of the carrier demodulator in which a digital signal processing is performed when a carrier wave demodulator performs a digital signal processing operation.

In order to achieve the above objects, there is provided a digital demodulator which includes a mixer for multiplying an IF signal from the IF output unit and a local oscillating signal from the local oscillator, a low pass filter for eliminating an image frequency component generated during an operation of the mixer, an A/D converter for converting an output signal from the low pass filter into a digital signal, a multiplier for multiplying an output data from the A/D converter and cosωt and sinωt which are combined signal values and converting into a base band width signal frequency, a demultiplexer for separating a base band width digital data into an I-signal component and Q-signal component, a frequency/phase difference detector for performing the signal processing and compensating the detected frequency and phase difference, an analog low pass filter for filtering an output signal from the frequency/phase difference detector, and a local oscillator for compensating the frequency/phase difference filtered by the analog low pass filter and providing the oscillating frequency which is synchronized with the IF signal inputted from the IF output unit to the mixer.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The digital demodulator according to the present invention will now be explained with reference to the accompanying drawings.

Figure 3:
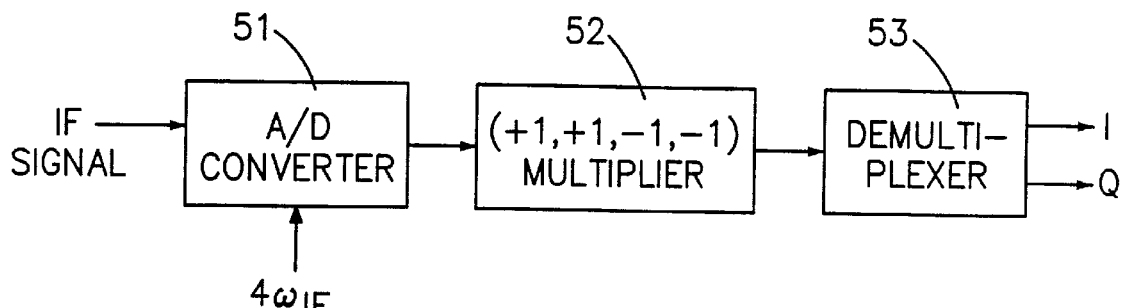
FIG. 3 is a block diagram illustrating a digital type circuit when converting into a base band width signal of an IF signal according to the present invention.

FIG. 3 illustrates a digital type circuit when converting into a base band width signal of an IF signal according to the present invention. As shown therein, the IF signal is sampled by an A/D converter 51 to a frequency which is about 4 times the sampling frequency $\omega_{IF}$, and is multiplied by a multiplier 52 having the values of +1, +1, −1, −1, and is frequency-changed to a base band width signal by a multiplexer 53.

Figure 4:
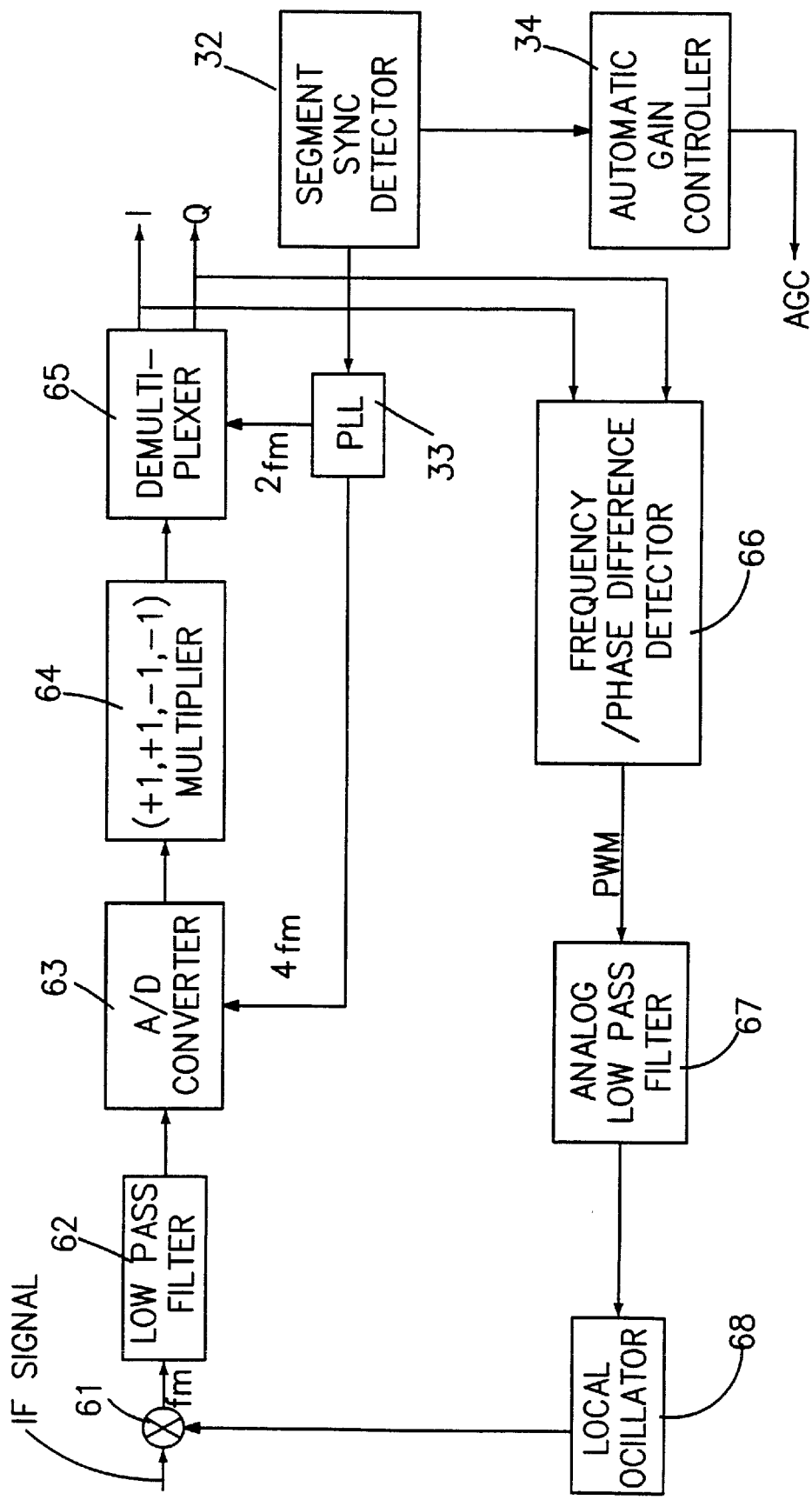
FIG. 4 is a block diagram illustrating a digital demodulator according to the present invention.

FIG. 4 is a block diagram illustrating a digital demodulator according to the present invention.

As shown therein, the digital demodulator according to the present invention includes a mixer 61 for multiplying an IF signal with a local oscillating signal from the local oscillator 68, a low band pass filter 62 for eliminating an image frequency component which is generated during the operation of the mixer 61, an A/D converter 63 for converting the output signal from the low pass filter 62 into a digital signal, a multiplier 64 for multiplying the output data from the A/D converter 63 by cosωt, sinωt which are a combined signal and digital-converting into the base band width signal, a demultiplexer 65 for separating the base band width digital data into an I-signal component and Q-signal component, a frequency/phase difference detector 66 for compensating the frequency and phase difference, an analog low band width filter 67 for filtering the output signal from the frequency/phase difference detector 66, and a local oscillator 68 for compensating a frequency/phase difference filtered by the analog low pass filter 67 and providing the oscillating frequency synchronized with the IF signal to the mixer 61. The remaining elements are identical with the conventional art. Therefore, the description of the elements identical with the conventional art will be omitted.

In the present invention, the operation is performed identically with the conventional art while the signal received through the antenna is amplified by the low noise intermediate frequency amplifier 14.

Figure 5:
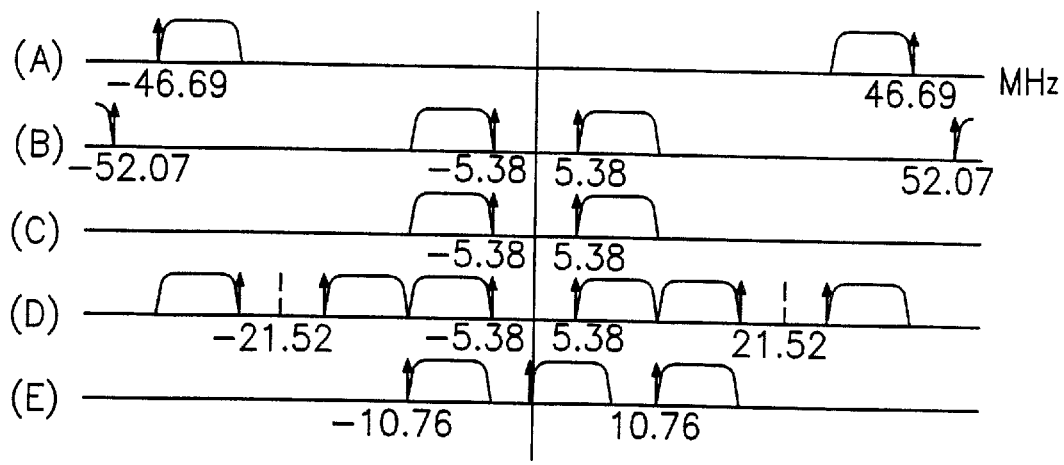
FIG. 5 is spectrum diagrams of signal of elements of FIG. 4.

In the output signal (fin) from the mixer 61 which signal is multiplied between the IF signal as shown by A of FIG. 5 passed through the low noise intermediate frequency amplifier 14 for processing the digital data at a symbol rate after synchronizing and the output frequency from the local oscillator 68, as shown by B of FIG. 5, there exists a pilot signal in 5.38MHz.

The output signals from the mixer 61 are filtered by the low pass filter 62 to have a spectrum shown by C of FIG. 5, and are sampled by the A/D converter 63 to 21.52 MHz which is 4 fin(fin: sampling frequency) from the PLL 33. The output spectrum from the A/D converter 63 is shown by D of FIG. 5.

The digital data combine-sampled by the A/D converter 63 is repeatedly multiplied by the values of +1, +1, −1, −1 by the multiplier 64.

Figure 6:
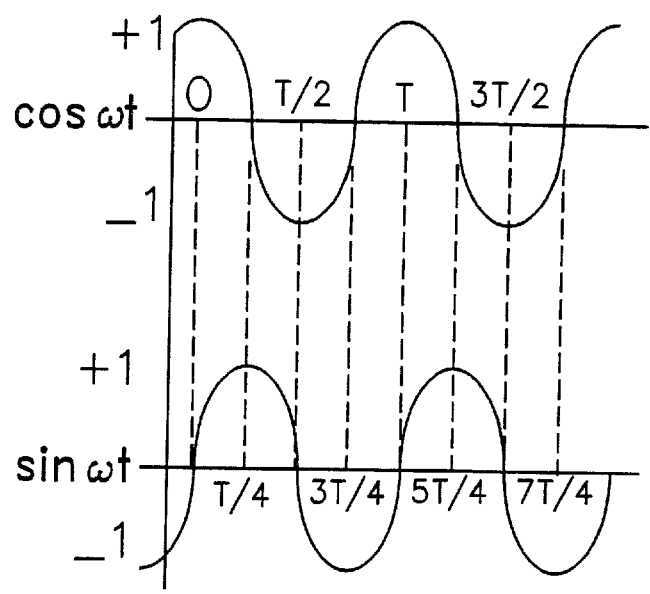
FIG. 6 is a wave form diagram of a signal of a multiplier of FIG. 4.

At this time, as shown in FIG. 6 illustrating the signal adapted to the multiplier 64, if the sampling time is t=0, since cosωt=+1, sinωt=0, the I-signal is the input signal, and the Q-signal is 0. Therefore, the sampled input data directly becomes the I-signal.

In addition, if t=T/4, since cosωt=0, and sinωt=1, the sampled input data directly becomes the Q-signal.

At t=T/2, the I-signal is like the sampled input data is multiplied by −1, namely, the value is like the sampled input data is inverted.

At t=3T/4, the inverted sampling input data becomes the Q-signal.

When t=T, t=5T/4, . . . , which is adapted in the above-described manner, the I- and Q-streams are repeatedly formed.

Therefore, the samples at the point where the I- and Q-signals have a value of 0, respectively, can be expressed as follows, in which the decimation effect is obtained.

I1, Q1, I2, Q2, I3, Q3, . . . .

Figure 1:
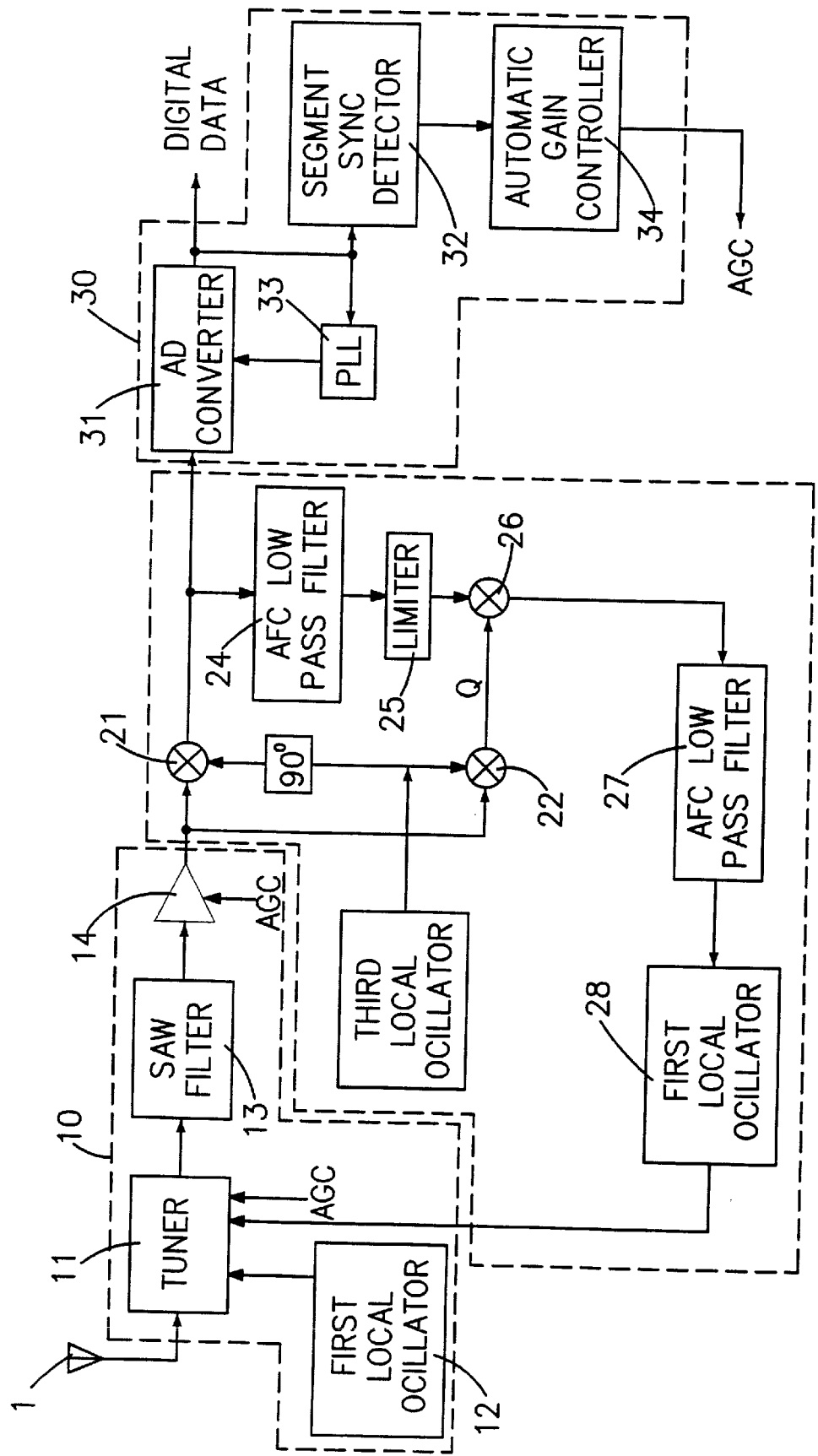
FIG. 1 is a block diagram illustrating a conventional GA type HDTV receiving unit.
Figure 2:
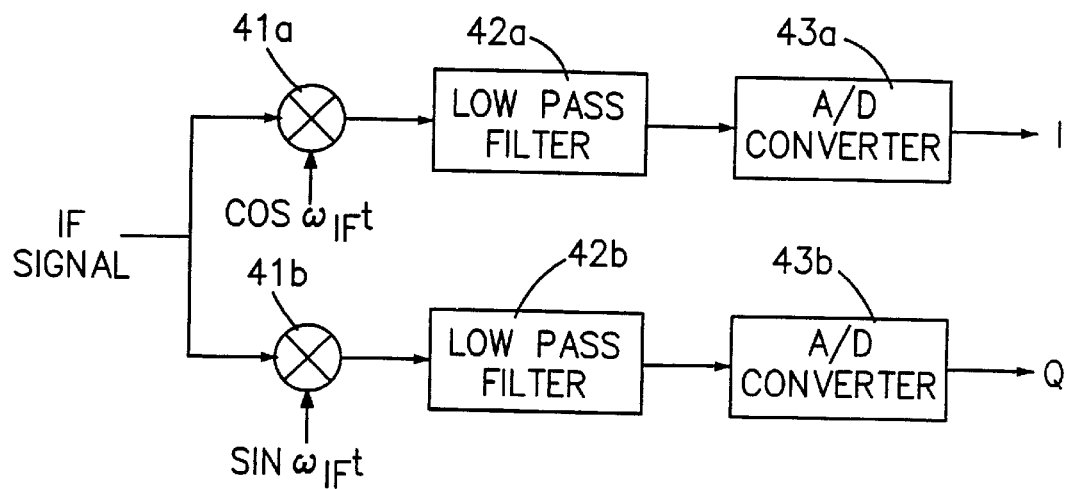
FIG. 2 is a block diagram illustrating an analog type circuit when converting into a base band width signal of an IF signal in the conventional art.

Therefore, the multiplier 64 multiplies the samples, which are repeatedly inputted, by the values of +1, +1, −1, −1, so that the effects of the low pass filters 42a and 42b shown in FIG. 2 are obtained.

In addition, since the output signals from the multiplier 64 are I1, Q1, I2, Q2, I3, Q3, . . . . , the input data from the multiplexer are alternately selected at a proper time, so that the I-signal and Q-signal are separated as follows.

I1, I2, I3, I4, . . . .

Q1, Q2, Q3, Q4, . . . .

Since the thusly separated digital I- and Q-signals include the frequency/phase difference, the frequency/phase difference detector 66 detects the same.

In addition, the digital demodulation by the segment/field synchronization in the rear circuit, the symbol timing recovery, the channel equalization is performed by only the I-signal.

The frequency/phase difference detector 66 demodulates (Pulse Width Modulation: PWD) the difference signal and outputs to the analog low pass filter 67.

The analog low pass filter 67 filters the PWM signal, and the mixer obtains the IF signal as shown by A of FIG. 5, and controls the local oscillator 68 so that the spectrum as shown by B of FIG. 5 is outputted.

In addition, the output frequency from the local oscillator 68 is used for compensating the frequency/phase difference of the signal.

The digital demodulator according to the present invention is adapted to the digital receiving unit including the HDTV such as a digital satellite broadcasting system, a digital cable television receiving unit.

As described above, the digital demodulator according to the present invention is directed to implementing the carrier wave after the A/D conversion, so that the ASIC of the digital demodulator is easily enabled, and the cost of the digital receiving unit is decreased thereby.

In addition, the digital demodulator according to the present invention has a good performance for demodulating the receiving signal compared to the conventional art which is directed to processing the carrier wave signal into the analog signal.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A digital demodulator wherein an IF signal is based on a signal received through an antenna, and including a carrier wave demodulator which demodulates a carrier wave with respect to an output signal from an IF output unit, and the IF output unit performs a segment/field synchronization, timing recovery, channel equalization, etc. with respect to the output signal from the carrier wave demodulator, the carrier wave demodulator additionally comprising:

a mixer for multiplying an IF signal from the IF output unit and a local oscillating signal from a local oscillator;

a low pass filter for eliminating an image frequency component generated during an operation of the mixer;

an AID converter for converting an output signal from the low pass filter into a digital signal;

a multiplier for multiplying an output data from the A/D converter and $\cos\omega t$ and $\sin\omega t$ which are combined signal values and converting into a base band width signal frequency;

a demultiplexer for separating a base band width digital data into an I-signal component and a Q-signal component;

a frequency/phase difference detector for performing a signal processing and compensating for a detected frequency and phase difference;

an analog low band width pass filter for filtering an output signal from the frequency/phase difference detector;

a local oscillator for compensating for the frequency/phase difference filtered by the analog low pass filter and providing an oscillating frequency which is synchronized with the IF signal inputted from the IF output unit to the mixer; and wherein the digital combined signal value of the multiplier is multiplied as ordered by the values of +1, +1, −1, −1 as sample values outputted sequentially from the A/D converter.

2. A digital demodulator wherein an IF signal is based on a signal received through an antenna and the signal is amplified by a low noise intermediate frequency amplifier, and including a carrier wave demodulator which demodulates a carrier wave with respect to an output signal from an IF output unit, and the IF output unit performs a segment/field synchronization, timing recovery, channel equalization, etc. with respect to the output signal from the carrier wave demodulator, the carrier wave demodulator additionally comprising:

a mixer for multiplying an IF signal from the IF output unit and a local oscillating signal from a local oscillator;

a low pass filter for eliminating an image frequency component generated during an operation of the mixer; and the output signals from the mixer are also filtered by the low pass filter;

an A/D converter for converting an output signal from the low pass filter into a digital signal;

a multiplier for multiplying an output data from the A/D converter and $\cos\omega t$ and $\sin\omega t$ which are combined signal values and converting into a base band width signal frequency;

a demultiplexer for separating a base band width digital data into an I-signal component and a Q-signal component;

a frequency/phase difference detector for performing a signal processing and compensating for a detected frequency and phase difference;

an analog low band width pass filter for filtering an output signal from the frequency/phase difference detector; and a local oscillator for compensating for the frequency/phase difference filtered by the analog low pass filter and providing an oscillating frequency which is synchronized with the IF signal inputted from the IF output unit to the mixer.

3. The digital demodulator of claim 2, wherein the digital combined signal value of the multiplier is multiplied as order by the values of +1, +1, −1, −1 at sample values outputted sequentially from the A/D converter.

4. The digital demodulator of claim 1, wherein said A/D converter is directed to sample an output signal from the low pass filter to a sampling frequency (4fin).

5. The digital demodulator of claim 1, wherein said frequency/phase difference detector demodulates (pulse-width-demodulation) the frequency/phase difference.

6. The digital demodulator of claim 1, wherein said frequency/phase difference detector demodulates (pulse-width-demodulation) the frequency/phase difference.

7. The digital demodulator of claim 4, wherein said frequency/phase difference detector demodulates (pulse-width-demodulation) the frequency/phase difference.

8. The digital demodulator of claim 2, wherein the IF signal is sampled by the A/D converter to a frequency which is about four times the sampling frequency $\omega_{IF}$ and is multiplied by the multiplier having the values of +1, +1, −1, −1.

9. The digital demodulator of claim 1, wherein a mixer receives the IF signals for transmission into the law pass filter for sampling by the A/D converter to 21.52 MHz.

10. The digital demodulator of claim 1, wherein the A/D converter samples the IF signal to a frequency four times the sampling frequency to produce the digital combined signal value.

11. The digital demodulator of claim 1, wherein said A/D converter is directed to sample an output signal from the low pass filter to a sampling frequency (4fin).

12. The digital demodulator of claim 1, wherein the multiplied digital combined signal value is the same as the function multiplied from $\cos\omega t$ and $\sin\omega t$ at the output data outputted from the A/D converter.

* * * * *